United States Patent [19]

Craig et al.

[11] 4,345,143
[45] Aug. 17, 1982

[54] FOOD WARMING AND COOKING CABINET

[75] Inventors: Ernest M. Craig; John M. Minor, both of Richmond, Va.

[73] Assignee: Golden Skillet Corporation, Richmond, Va.

[21] Appl. No.: 160,994

[22] Filed: Jun. 19, 1980

[51] Int. Cl.³ .............................................. H05B 9/00
[52] U.S. Cl. .................................... 219/411; 219/386; 219/354; 219/405; 219/413; 99/448; 312/236
[58] Field of Search ............... 219/354, 385, 386, 405, 219/406, 411, 412, 413, 553; 99/447, 448; 312/214, 236

[56] References Cited

U.S. PATENT DOCUMENTS

| | | | |
|---|---|---|---|
| 3,108,173 | 10/1963 | Barrett et al. | 219/411 X |
| 3,205,033 | 9/1965 | Sturtz | 312/236 |
| 3,313,916 | 4/1967 | Achner | 219/385 |
| 3,536,891 | 10/1970 | Lee et al. | 219/385 |
| 3,710,550 | 1/1973 | Osborne | 219/354 X |
| 3,886,346 | 5/1975 | Meyers | 219/386 |
| 3,895,215 | 7/1975 | Gordon | 219/400 |
| 4,030,476 | 6/1977 | Hock | 126/246 |
| 4,146,777 | 3/1979 | Wells et al. | 219/411 |
| 4,164,643 | 8/1979 | Peart et al. | 219/411 |
| 4,238,995 | 12/1980 | Polster | 219/411 X |

FOREIGN PATENT DOCUMENTS 2005824 4/1979 United Kingdom ................ 219/411

Primary Examiner—Volodymyr Y. Mayewsky

[57] ABSTRACT

A food warming and cooking cabinet comprising a housing having infrared reflective material on the interior surface, a source of infrared radiation located inside the housing and a support for a plurality of trays adapted to carry food thereon. The source of infrared radiation comprises two vertically oriented tubular infrared lamps located on opposite sides of the housing with the tray support therebetween. Each lamp is located in a recess in opposed side walls. The infrared reflective material is polished aluminum.

2 Claims, 4 Drawing Figures

FOOD WARMING AND COOKING CABINET

FIELD OF THE INVENTION

The present invention relates to a portable food warming and cooking cabinet especially useful by caterers or in fast-food restaurants. The food is warmed and cooked by infrared radiation.

BACKGROUND OF THE INVENTION

Numerous prior art cabinets are known for warming food. These types of cabinets are especially useful in the catering business, hotels and restaurants, especially fast-food restaurants. The basic purpose of such cabinets is to maintain already cooked food at an elevated temperature so that upon serving they are not too cold to eat.

Many of these prior art devices utilize steam to keep the food warm; however, these devices require expensive seals to keep the humid hot air inside the cabinet. Many of these prior art devices also utilize complicated baffles and air flow channels to maintain the food at an elevated temperature, making the cabinet construction very expensive. Moreover, many of the prior art devices require substantial energy and are therefore costly to run.

A further drawback of the prior art devices is that the food tends to loose its piquancy after 45 minutes and must be discarded after one and one-half hours due to exposure to the humid hot air utilized in the devices.

Such prior art cabinets are disclosed in the following U.S. Pat. Nos. 3,205,033, issued to Stentz on Sept. 7, 1965; 3,222,114, issued to Stentz on Dec. 7, 1965; 3,895,215, issued to Gordon on July 15, 1975; and 4,030,476, issued to Hock on June 21, 1977.

SUMMARY OF THE INVENTION

Accordingly, a primary object of the present invention is to provide a food warming and cooking cabinet that can maintain food therein at an elevated temperature for an extended period of time without loss of piquancy.

Another object of the present invention is to provide such a cabinet that warms and cooks food without steam or complicated air flow and with limited energy requirements.

Another object of the present invention is to provide such a cabinet that does not require expensive seals.

Another object of the present invention is to provide such a cabinet that is easy to manufacture and utilize.

The foregoing objects are basically attained by providing a food warming and cooking cabinet comprising a housing having infrared reflective material on the interior surface and an opening; a source of infrared radiation located inside the housing, the source comprising a vertically oriented tubular infrared lamp; and a support, located inside the housing, for a plurality of trays adapted to support food thereon to be warmed and cooked by the source of infrared radiation.

By utilizing infrared radiation in the form of a vertically oriented tubular infrared lamp, expensive seals are not required and energy requirements are kept to a minimum. Moreover, by eliminating the need for high humidity air, the food remains palatable for many hours inside the cabinet.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure:

DETAILED DESCRIPTION OF THE INVENTION

Figure 4:
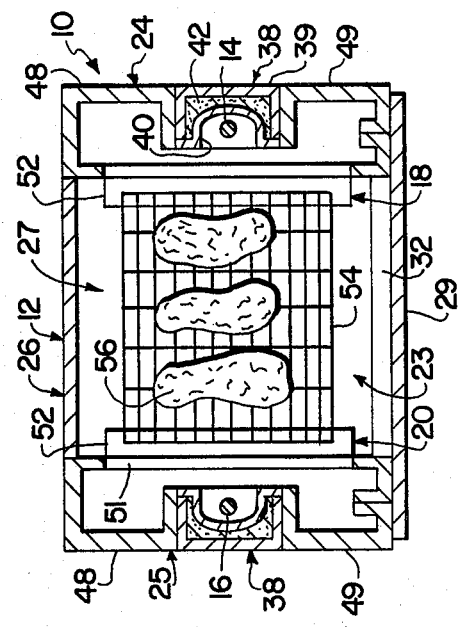
FIG. 4 is a top plan view in section taken along lines 4—4 in FIG. 2 showing the tray carrying the food located between two vertically oriented tubular infrared lamps in accordance with the present invention.

As seen in FIGS. 1-4, the food warming and cooking cabinet 10 in accordance with the present invention comprises a housing 12, a first tubular infrared lamp 14, a second tubular infrared lamp 16, a first tray support 18 and a second tray support 20.

Figure 3:
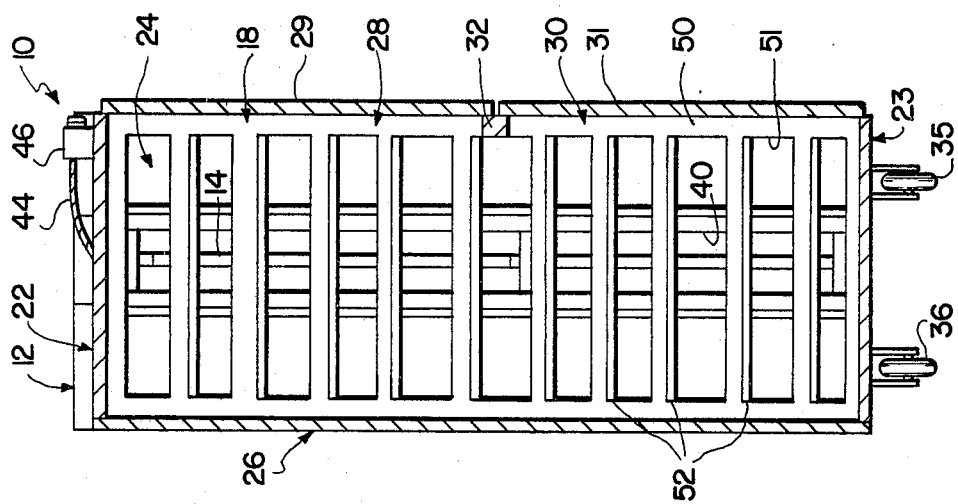
FIG. 3 is a side elevational view in section taken along lines 3—3 in FIG. 2 with the trays eliminated for clarity.
Figure 2:
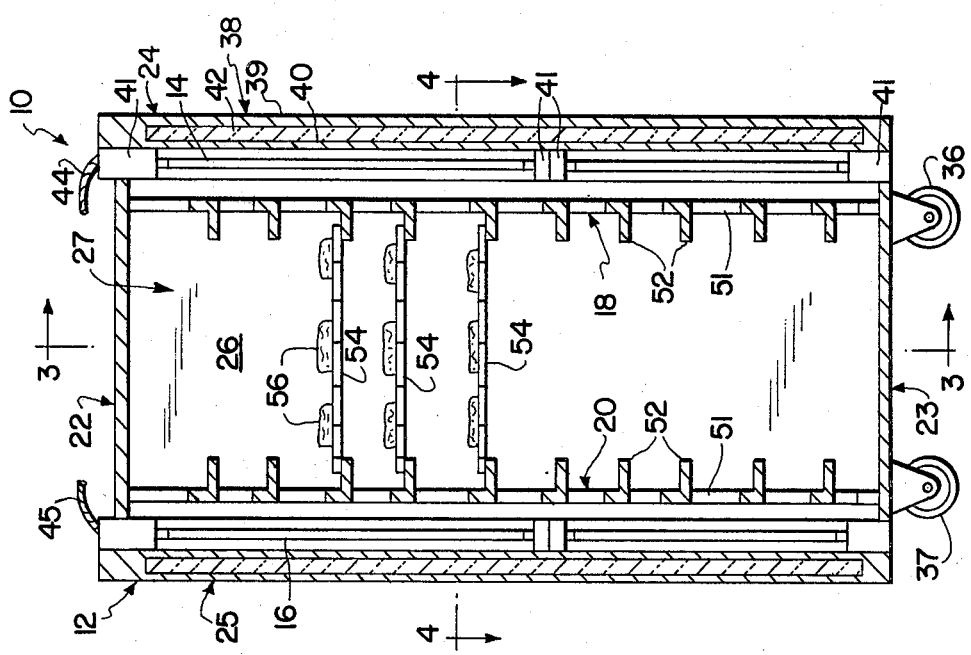
FIG. 2 is a front elevational view in longitudinal section of the cabinet in accordance with the present invention with three trays containing food thereon located inside the cabinet.

The housing 12, as seen in FIGS. 2 and 3, comprises substantially planar and rectangular walls including a top wall 22, a bottom wall 23, a first side wall 24, a second side wall 25, and a rear wall 26. These walls define a chamber 27 into which the food is placed for warming and cooking by the infrared lamps. To gain access to this chamber 27 the top, bottom and first and second side walls define an upper opening 28 and a lower opening 30 separated by a horizontal support 32. The upper opening 28 is covered by an upper door 29 hingedly coupled to the first side wall 24 and the lower opening is covered by a lower door 31 hingedly coupled to the first side wall 24. These doors are provided merely for sanitation purposes and require no sealing arrangement.

These walls are coupled together in a conventional fashion by means of rivets, bolts or welding as desired, the only requirement being the formation of a chamber having infrared reflective material on the interior surface. In order to accomplish this, the interior surfaces of the top, bottom, first side, second side and rear walls are formed of highly polished aluminum. The exterior surfaces of the walls can be insulated in any conventional manner.

Figure 1:
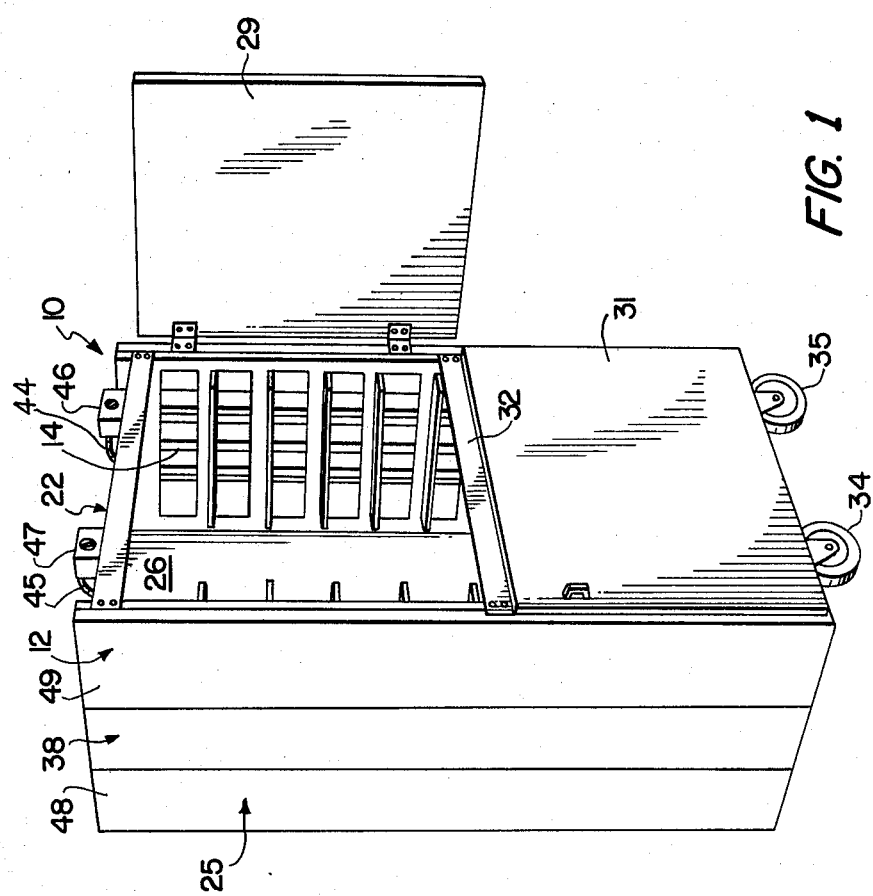
FIG. 1 is a perspective view of the cabinet in accordance with the present invention with the upper door in an open position.

To provide portability of the cabinet a plurality of rollers 34–37 are coupled to the bottom of the bottom wall 23, as seen in FIGS. 1–3.

The source of infrared radiation comprises the first and second tubular infrared lamps 14 and 16, which are located inside the housing midway between the front and rear of the housing. These lamps are vertically oriented and extend from substantially the top to substantially the bottom of the housing 12. These lamps are advantageously of the kind manufactured by the General Electric Company and designated as T-3 Tubular Quartz Infrared Lamps. Each of the lamps are of 375-watt size. They are hermetically sealed and gas-filled with linear tungsten filaments.

As seen in FIGS. 2 and 4, each lamp is supported by a reflector assembly 38 comprising a U-shaped stainless steel backing member 39, a curved reflector 40 formed of highly polished aluminum and coupled to the backing member, and a plurality of supports 41 suitably coupled to the reflector 40. As best seen in FIG. 2, the first tubular lamp 14 comprises two portions, which can advantageously be about three feet and two feet long respectively. Interposed between the backing member 39 and the reflector 40 is fiberglass insulation 42. Each lamp is recessed into the curved reflector.

The two infrared lamps 14 and 16 are coupled via electrical conduits 44 and 45 at the top thereof, respectively, to two power regulators 46 and 47 of the infinite control type. These power regulators are in turn electrically connected to a suitable electrical power source. By manipulating suitable control knobs on the regulators, the infrared lamps can be adjusted so they are activated for 20% of the time up to 100% of the time. Advantageously, a setting of activation for 35% of the time is sufficient for warming of food placed inside chamber 27, while cooking can take place when the regulators are activated for 75 to 85% of the time.

As best seen in FIGS. 2 and 4, the two reflector assemblies 38 for the two infrared lamps 14 and 16 are interposed between channel sections 48 and 49, which in combination with the reflector assemblies form the first and second side walls 24 and 25. Advantageously, the reflector assemblies can be conventionally releasably secured between the two sections so that they can be removed to replace burned-out lamps.

As seen in FIGS. 2-4, the first and second tray supports 18 and 19 are interposed between infrared lamps 14 and 16 inside chamber 27. Each of these tray supports comprises an elongated sheet 50, formed for example, from aluminum, with a series of rectangular cutouts 51 formed therein with a portion of the material of the sheet 50 being bent out of the plane thereof to form tray supporting flanges 52. Each of the sheets 50 is suitably secured inside the chamber 27, with the rear side thereof advantageously being integrally formed with section 48 forming the first side and second side walls and the front side being suitably connected to the other section 49. The flanges 52 are horizontally oriented and opposed pairs thereof from the first and second tray supports 18 and 20 support trays 54 therebetween which have food, such as chicken or steak 56 supported thereon. Advantageously, the trays 54 are in the form of an open lattice and, although not shown, can each have a drip pan coupled thereto to receive drippings from the warming or cooking food 56 located thereon.

As seen in FIGS. 2 and 4, the food 56 located on the trays 54 inside chamber 27 is directly between the vertically oriented tubular infrared lamps 14 and 16. In order to provide the desired warming or cooking operation, the regulators 46 and 47 are activated causing lamps 14 and 16 to give off infrared radiation which warms or cooks the food 56. This warming or cooking action is derived from conversion of the infrared radiation into heat by the impedance provided by the food. Thus, the food can be warmed or cooked even if the doors are open. However, for sanitary purposes, it is desirable to keep the doors closed as much as possible.

Because the interior surface of the walls forming the housing 12 are of highly polished aluminum, the infrared radiation emanating from the lamps is reflected towards the food.

While one advantageous embodiment has been chosen to illustrate the invention, it will be understood by those skilled in the art that various changes and modifications can be made therein without departing from the scope of the invention as defined in the appended claims.

What is claimed is:

1. A food warming and cooking cabinet comprising:
   a housing having interconnected side walls, a rear wall and a forward wall having an access opening therein;
   a manually operable door connected to said housing and adapted to close said access opening;
   said side walls and said rear wall having polished aluminum interior surfaces which surround and define an interior chamber to which access is obtainable through said access opening when said door is opened;
   a pair of tubular infrared lamps disposed in said chamber adjacent said side walls;
   each of said side walls having a vertically extending central concave recess formed therein;
   one of said lamps being disposed in each of said recesses;
   a pair of vertical support walls disposed within said chamber in spaced parallel relation to said side walls;
   each of said lamps being disposed between a side wall and an adjacent support wall;
   said support walls having a plurality of vertically spaced apertures therein and having inwardly directed horizontal flanges beneath said apertures;
   said flanges being adapted to receive and support trays upon which food can be placed for warming or cooking;
   an electrical power supply connected to said lamps; and
   adjustable power regulator means connected with said power supply and said lamps for controlling the length of time said lamps are activated;
   said lamps, when activated, providing infrared radiation which projects through said apertures to warm or cook food placed within said chamber upon said support trays.

2. A food warming and cooking cabinet as defined in claim 1 further including ground engaging wheels at the bottom of said housing.

* * * * *